United States Patent
Goto et al.

[19]

[11] Patent Number: 6,050,489
[45] Date of Patent: Apr. 18, 2000

[54] BAR CODE SYSTEM FOR BROWNIE FILM AND BAR CODE READER OF CAMERA

[75] Inventors: Shigenori Goto, Saitama; Teruyoshi Makino, Kanagawa; Hisashi Hamada; Tokuji Sato, both of Saitama, all of Japan

[73] Assignees: Fuji Photo Film Co., Ltd., Kanagawa; Fuji Photo Optical Co., Ltd., Saitama, both of Japan

[21] Appl. No.: 09/056,685

[22] Filed: Apr. 8, 1998

[30] Foreign Application Priority Data

| Apr. 8, 1997 | [JP] | Japan | 9-089743 |
| Apr. 8, 1997 | [JP] | Japan | 9-089744 |
| Apr. 25, 1997 | [JP] | Japan | 9-109476 |

[51] Int. Cl.⁷ ........................................ G06K 5/00
[52] U.S. Cl. .................. 235/462.16; 235/379; 235/469; 235/440; 235/454; 396/310; 396/210; 396/315; 396/207
[58] Field of Search ............................. 235/462.05, 375, 235/469, 440, 454, 462.16, 462.18, 462.19; 396/310, 210, 315, 207

[56] References Cited

U.S. PATENT DOCUMENTS

| 5,122,645 | 6/1992 | Saeki et al. | 235/462 |
| 5,128,519 | 7/1992 | Tokuda | 235/375 |
| 5,164,574 | 11/1992 | Ujiie et al. | 235/462 |
| 5,264,683 | 11/1993 | Yoshikawa | 235/375 |
| 5,268,563 | 12/1993 | Takenaka | 235/462 |
| 5,376,780 | 12/1994 | Klueter | 235/462 |
| 5,530,517 | 6/1996 | Patton et al. | 355/40 |
| 5,845,869 | 12/1998 | Makino | 242/584.1 |
| 5,866,893 | 2/1999 | Reichenbach et al. | 235/462 |

*Primary Examiner*—Donald Hajec
*Assistant Examiner*—Daniel S. Felten
*Attorney, Agent, or Firm*—Young & Thompson

[57] ABSTRACT

A bar code is provided on a Brownie film roll by printing black bar elements on a high-reflective obverse surface of an adhesive tape that secures a leading end of a filmstrip to a light-shielding paper. Spacings between the black bar elements form white bar elements. A reflective photo sensor scans the bar code while the light-shielding paper and the filmstrip are advanced in a camera. Signal level of the photo sensor is sampled, and at least one maximum value and one minimum value of the signal level are held. The sampled signal level is compared to threshold values to detect a leading edge of the adhesive tape, a leading edge of a first black bar element and borders between the bar elements. The threshold values for detecting the leading edge of the first black bar element and for detecting borders between the bar elements are seriatim revised according to the held maximum and minimum values.

17 Claims, 8 Drawing Sheets

| BIT PATTERN | 0 1 0 | 0 0 0 1 1 0 1 0 0 1 |
|---|---|---|
| DATA ITEM | 120/220 FILM LENGTH | FILM SPEED & OTHER CLASSIFICATION |

BAR CODE SYSTEM FOR BROWNIE FILM AND BAR CODE READER OF CAMERA

BACKGROUND OF THE INVENTION

1. Field of the Invention

The present invention relates to a bar code system for Brownie film and a bar code reader of a camera for reading bar code from the Brownie film.

2. Background Arts

ISO 120 type and 220 type rolled films are called Brownie film roll in the art. In the 120 type, a 6 cm wide photo filmstrip is secured by an adhesive tape to a light-shielding paper which is longer than the filmstrip and backs the entire length of the filmstrip. The filmstrip is coiled with the light-shielding paper around a spool. In the 220 type, two sheets of light-shielding paper are spliced by adhesive tapes to leading and trailing ends of a 6 cm wide photo filmstrip, and are coiled together around a spool. The light-shielding paper shields the filmstrip from ambient light before and after use of the film roll. Besides, the 120 type is graded into two sizes according to the length of the filmstrip. Both the 120 type and the 220 type are classified by the film speed, divided into negative and reversal, and categorized as color film roll or as black-and-white film roll.

In conventional medium-sized cameras, or called Brownie cameras, the pressure plate and the frame counter are manually adjusted to the film roll type and the film length, and the film speed is manually entered each time a new film roll is loaded. To simplify or automatize these setting up operations, U.S.P. Application Ser. No. 08/712,387 suggests providing a bar code on the adhesive tape at the leading portion of the Brownie film. By providing the medium-sized camera with a bar code reader using a reflective photo sensor, it is possible to read the bar code during first frame setting, that is, while the Brownie film is initially advanced to position a first frame exposure area behind an exposure aperture.

Bar code in general consists of alternating high reflective and low reflective bar elements, hereinafter called white and black bar elements respectively. The bar elements have either a narrow width or a wide width regardless of whether it is black or white. The wide bar elements represent binary "1", whereas the narrow bar elements represent binary "0". Since the bar elements should extend orthogonally to the advancing direction of the Brownie film to read it during the film advancing, the width of each bar element means the length in the film advancing direction, i.e. the lengthwise direction of the filmstrip. According to the ISO standard, the length of the adhesive tape of the Brownie film roll in the lengthwise direction of the filmstrip is limited up to 25 mm. Therefore, when the bar code is to be provided on the adhesive tape, the entire length of the bar code in the lengthwise direction of the filmstrip is limited correspondingly. The number of bar elements and the narrow and wide widths of the bar elements are limited by the entire length of the bar code as well as the requisite number of bits. For reliable discrimination between the wide bar element and the narrow bar element, the wide bar width should preferably be about 2.5 times the narrow bar width. It is also necessary to provide quiet zones before and behind the bar code elements. To provide a 13-bit bar code, the narrow bar width is about 0.8 mm.

To distinguish the wide bar element from the narrow bar element, borders between the white bar elements and the black bar elements, i.e. edges of the black bar elements, are detected, and the width of each bar element is measured as a spacing between two adjacent borders. If the reflection densities of the white bar elements and the black bar elements are respectively constant, and differ sufficiently from each other, the borders between the black and white bar elements can be detected by the reflective photo sensor with high accuracy.

On the other hand, since the reflectance of the adhesive tape is generally higher than that of the light-shielding paper, it is possible and efficient to print black bar elements directly on the adhesive tape, while using the obverse surface of the adhesive tape as white bar elements. In that case, however, since the reflectance of the adhesive tape varies depending upon the film manufacturer, amplitude of output signal from the photo sensor also varies even if the black bar elements have an uniform reflectance. For this reason, it is practically difficult to reliably discriminate between the black and white bar elements by use of a constant threshold value in any Brownie film rolls.

Moreover, since the adhesive tape as well as the filmstrip curls inevitably while it is rolled around the spool, the distance from the obverse surface of the adhesive tape to the photo sensor varies up to 1 mm or so, as the adhesive tape passes in front of the photo sensor. The variation in the distance results a variation in the sensor output signal. Therefore, using a constant threshold value for the border discrimination tends to cause reading failure, even if the reflectance of the adhesive tape and that of the black bar elements are respectively standardized for any Brownie film rolls. Because the photo sensor of the camera can scan the bar code only once during the first frame setting of the Brownie film, it is necessary to check if the sensor output signal is free from errors, in order to decode the bar code with accuracy based on the sensor output signal.

After the borders between the bar elements are detected, and the width of each bar element is measured, the binary value of each bar element is determined by comparing the measured width to a reference width. Using a fixed value as the reference width leads to restricting the frequency of clock pulses that are used for measuring the width of each bar element, and thus restricting the design of the bar code reader. Tolerance in width of the respective bar elements is also restricted, so that the manufacturing cost is raised.

It is possible to provide a preliminary bar code before the bar code in the film advancing direction, such that the preliminary bar code have a constant bit pattern so the camera can determine a reference width based on the data detected from the preliminary bar code. Thereby, the reference width is adjusted automatically in each camera for each Brownie film roll. However, since the length of the adhesive tape in the film advancing direction is limited, it is necessary for adding the preliminary bar code to reduce the widths of the respective bar elements or the number of bar elements of the bar codes. To record sufficient amount of data, the number of bar elements, i.e. the number of bits, cannot be reduced so much. To detect the bar elements with reduced widths, an expensive bar code reader with high resolving power is necessary.

SUMMARY OF THE INVENTION

In view of the foregoing, an object of the present invention is to provide a bar code system consisting of a Brownie film roll having a bar code on an adhesive tape and a bar code reader, which makes it possible to determine an appropriate reference width for discrimination between the wide bar elements and the narrow bar elements, without the need for reducing the widths of the bar elements or the number of bar elements.

Another object of the present invention is to provide a bar code reader of a camera for use with a Brownie film roll having a bar code provided on an adhesive tape, which can detects borders between the bar elements with accuracy even through output level of the photo sensor fluctuates for the reasons as set forth above.

To achieve the first object, a Brownie film roll of the present invention is provided with a bar code wherein first three bar elements, in the order to scan the bar code, have a constant total width independently of data represented by the bar code.

According to the invention, a bar code reader of a camera for use with the Brownie film roll having the bar code of the present invention, is comprised of: a reflective photo sensor for scanning the bar code while the light-shielding paper and the filmstrip are advanced in a camera; a device for detecting borders between the black bar elements and the white bar elements based on signal level of the photo sensor; a device for measuring widths of the individual bar elements based on the detected borders; a memory for storing data of the measured widths; a device for calculating a reference width from a total of the measured widths of the first three bar elements; a device for discriminating between those bar elements having the wide width and those having the narrow width by comparing the measured widths to the reference width; and a device for decoding the bar code based on a bit pattern of the bar code corresponding to an arrangement of the narrow width and the wide width of the bar elements.

To achieve the second object, a bar code reader of a camera of the present invention is comprised of: a reflective photo sensor for scanning the bar code while the light-shielding paper and the filmstrip are advanced in a camera; a device for sampling signal level of the photo sensor and holding at least one maximum value and one minimum value of the output level of the photo sensor; a device for detecting the leading edge of the adhesive tape by comparing the sampled signal level to a predetermined threshold value; and a device for detecting borders between the bar elements by comparing the signal level of the photo sensor to a threshold value while revising the threshold value after each detection of the borders in accordance with the held maximum and minimum values.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
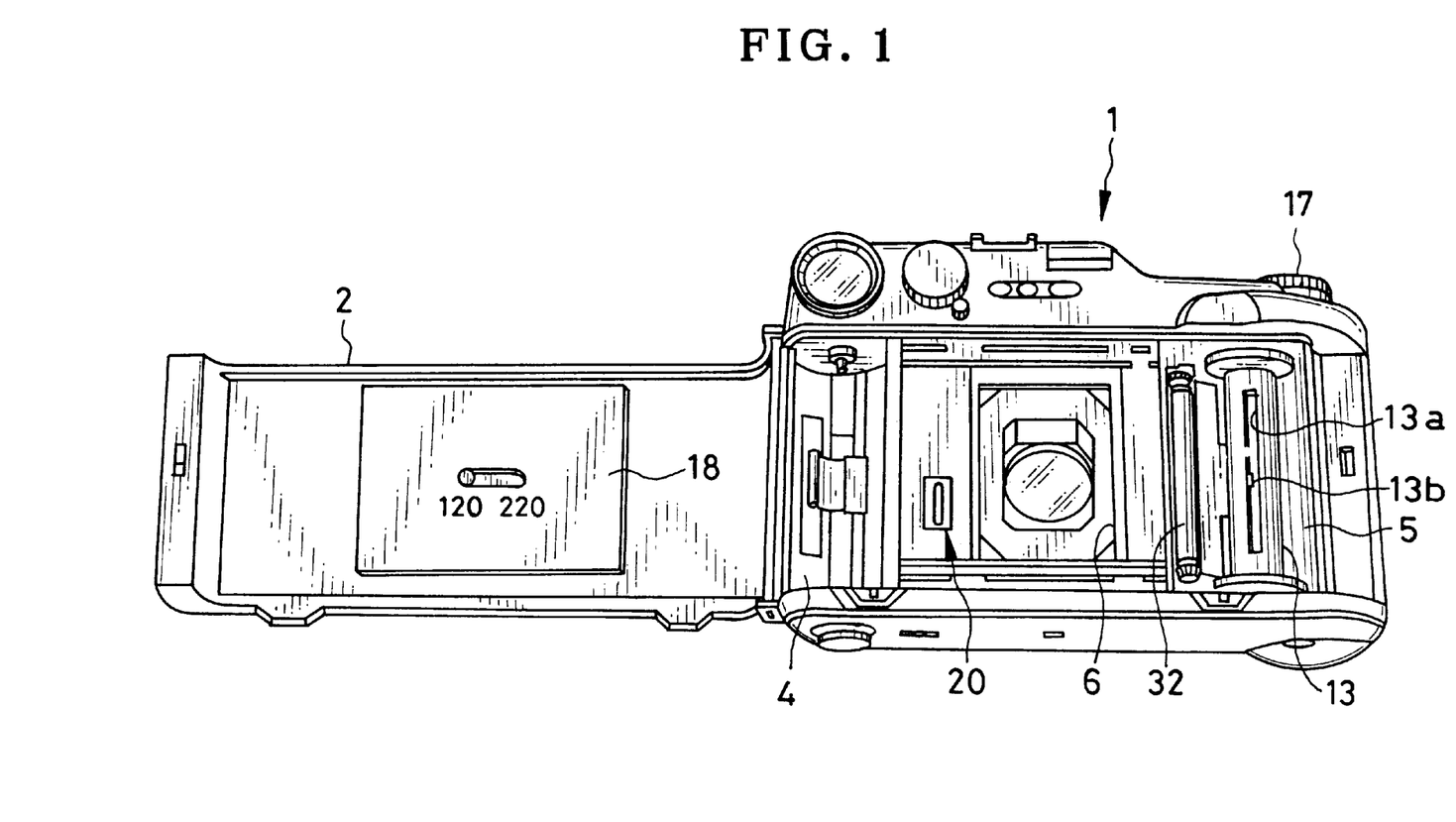
FIG. 1 is a rear side view of a Brownie camera with its rear lid open, having a bar code reader according to an embodiment of the present invention.

A camera 1 shown in FIG. 1 is a Brownie camera which is to take a semi-size picture frame of 6 cm×4.5 cm on Brownie film. When a rear lid 2 is open, a film supply chamber 4, a film take-up chamber 5 and an exposure aperture 6 are exposed.

Figure 2:
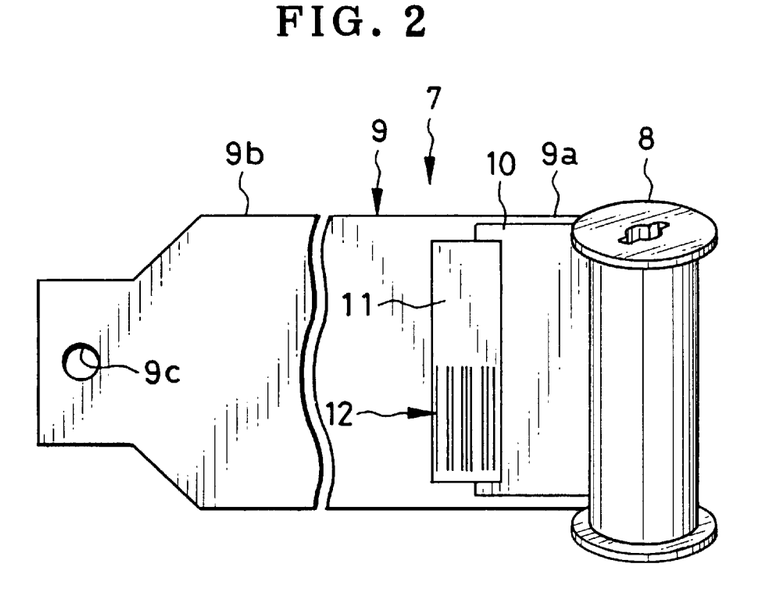
FIG. 2 is an explanatory view of a 120-type Brownie film roll.

As shown in FIG. 2, a 120 type film roll 7 is constituted of a filmstrip 10 and a light-shielding paper 9 which are rolled together around a spool 8. The light-shielding paper 9 consists of a backing portion 9a backing the filmstrip 10, a leader portion 9b extending beyond a leading end of the filmstrip 10, and a not-shown trailer portion extending beyond a trailing end of the filmstrip 10. The filmstrip 10 is secured to the light-shielding paper 9 at the leading end by an adhesive tape 11. The leader portion 9b constitutes the outermost convolution of the film roll 7 before use, so the filmstrip 10 is shielded from ambient light. In the 220 type, the backing portion 9a of the light-shielding paper 9 is omitted, and a leader paper and a trailer paper are spliced to the opposite ends of a filmstrip by use of an adhesive tape each. The leader paper functions in the same way as the leader portion 9b.

The filmstrip 10 may have a full length or a half length within the 120 type. The full length filmstrip 10 can take twelve full-size frames of 6 cm×6 cm, and the half length filmstrip 10 can take six full-size frames. When it comes to the semi-size frame, sixteen frames are available from the full length filmstrip 10, and eight frames are available from the half length filmstrip 10. On the other hand, as the 220 type film roll has no backing portion 9a, its filmstrip is about twice the full length of the 120 type, while the diameter of the 220 type film roll is equal to that of the 120 type full length film roll. As for the 220 type, the size of the filmstrip 10 is uniform. Therefore, twenty-four full-size frames or thirty-two semi-size frames are available from the 220 type.

A bar code 12 is provided on the adhesive tape 11 of the 120 type film roll 7, or on the adhesive tape that is used to secure the leader paper to the filmstrip 10 of the 220 type film roll. Although the present embodiment will be described with respect to the 120 type film roll 7, the same applies to the 220 type film roll. The adhesive tape 11 is made of a synthetic paper having a white obverse surface, and the bar code 12 is formed by printing black bar elements directly on the white obverse surface of the adhesive tape 11 with given spacings. Thus, the spacings between the black bar elements, i.e. the white obverse surface appearing between the black bar elements serve as white bar elements of the bar code 12.

Figure 3:
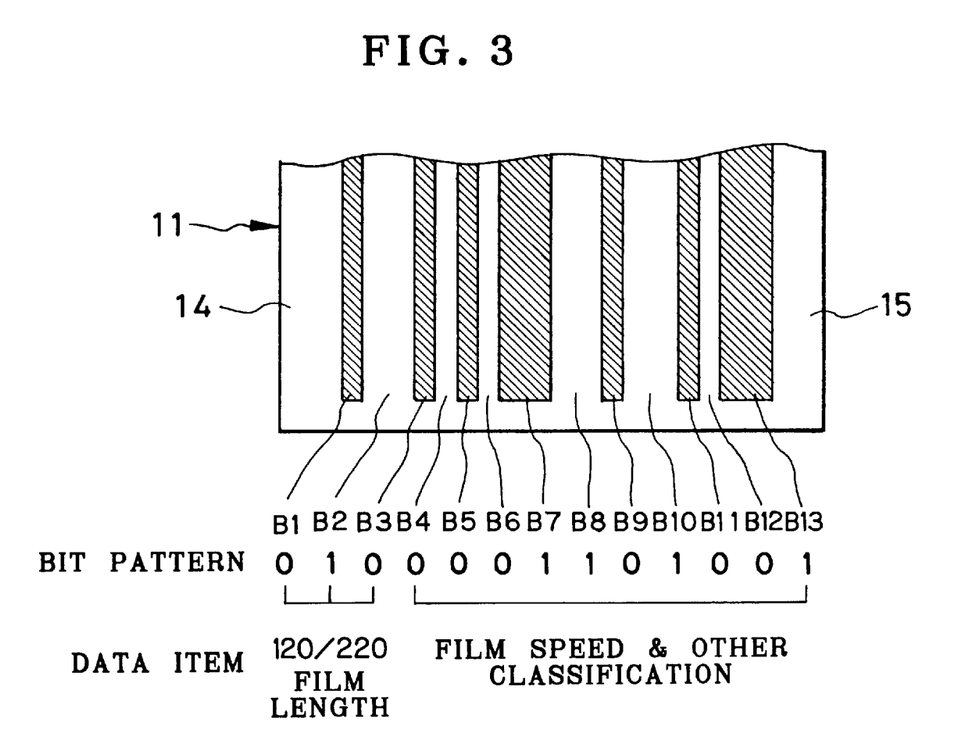
FIG. 3 is an explanatory view of a bar code provided on an adhesive tape of the Brownie film roll, according to an embodiment of the present invention.

As shown in FIG. 3, seven black bars are printed on the adhesive tape 11, for example, by thermal transfer printing. Thus, the bar code 12 consists of thirteen bar elements B1 to B13 representative of 13-bit data. A start quiet zone 14 and an end quiet zone 15 are provided respectively before and after the bar code 12 in the film advancing direction. Like the white bar elements, the quiet zones 14 and 15 are formed by the obverse surface of the adhesive tape 11. The bar elements have either a narrow width or a wide width, regardless of whether it is white or black. The narrow bar elements have a width of about 0.8 mm, whereas the wide bar elements are about 2.5 times as wide as the narrow bar elements.

A hole 9c is formed through the leader portion 9b of the light-shielding paper 9. After the film roll 7 is put in the film supply chamber 4 of the camera 1, the leader portion 9b is inserted into a slit 13a of a take-up spool 13 that is previously mounted in the film take-up chamber 5. Thereby, the hole 9c is caught on a hook 13b formed on the slit 13a, securing the leader portion 9b to the take-up spool 13. Thereafter when the rear lid 2 is closed, the light-shielding paper 9 and thus the filmstrip 10 are automatically wound up onto the take-up spool 13 to advance the filmstrip 10 one frame after another during the photography. After all available frames are photographed, the trailer portion of the light-shielding paper 9 or the trailer paper constitutes the outermost convolution of the film roll 7, shielding the exposed filmstrip 10 from ambient light. It is to be noted that the spool 8 of the film roll 7 may have the same construction as the take-up spool 13, and may be reused as the take-up spool 13.

It is possible to use a Brownie film roll that does not have the hole 9c nor the hook 13b. In that case, the photographer inserts the leader portion 9b into the slit 13a and then rotates a film winding wheel 17 to turn the leader portion 9b around the take-up spool 13. Thus, the filmstrip 10 is advanced automatically by rotating the take-up spool 13. As conventional, a pressure plate 18 is adjusted to the film roll type. The position of the pressure plate 18 is detected by a sensor pin when the rear lid 2 is closed, so the camera 1 determines whether the loaded film roll is of 120 type or 220 type based on the position of the pressure plate 18.

Figure 4:
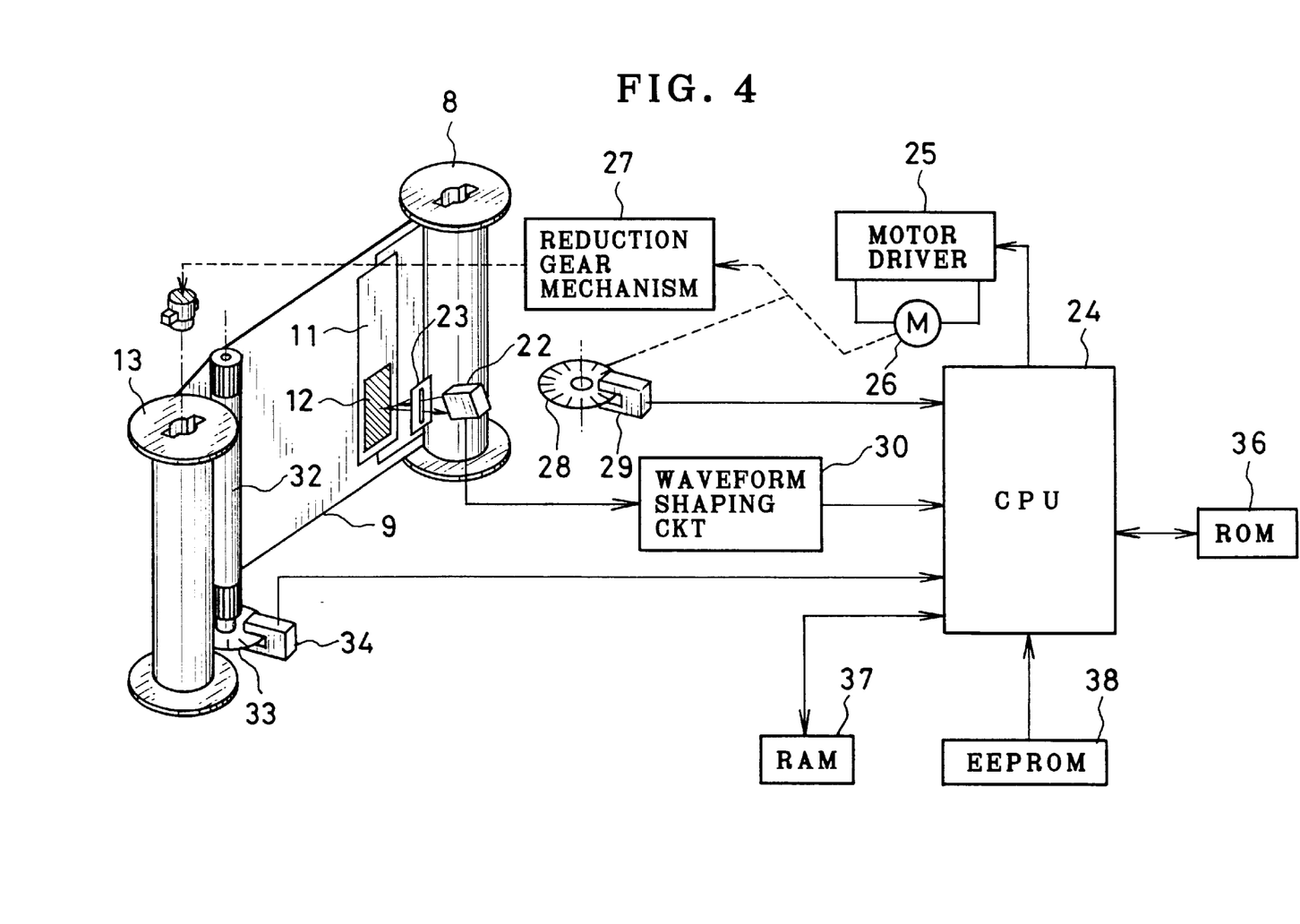
FIG. 4 is a schematic diagram of the bar code reader of the Brownie camera.

The bar code 12 is read through a sensor unit 20 that is mounted in a wall between the film supply chamber 4 and the exposure aperture 6. As shown in FIG. 4, the sensor unit 20 consists of a reflective photo sensor 22 and a mask plate 23 disposed in front of the photo sensor 22. The mask plate 23 is provided with a slit that extends rectangularly to the film advancing direction, that is, in parallel to the bar elements. The width of the slit is about 0.6 mm, that is less than the narrow bar width. Through the slit, the photo sensor 22 projects light and receives reflection light. The projection light has a wavelength range out of the sensitive range of the filmstrip 10, i.e. 900 nm to 950 nm.

In order for the reflective photo sensor 22 to distinguish the black from the white bar elements with reliability, the white bar elements and thus the obverse surface of the adhesive tape 11 should have a reflectance of not less than 50% and a glossiness of not more than 35%, whereas the black bar elements should have a reflectance of not more than 30% and a glossiness of not more than 20%. If the glossiness of the black bar element or the white bar element is larger than the above value, regular reflection becomes too large to precisely detect the edge of the black bar elements. To make sure to eliminate the bad effect of the regular reflection, the photo sensor 22 is inclined relative to the obverse surface of the adhesive tape 11 such that the photo sensor 22 receives diffuse reflection light from the bar code 12. It is preferable to incline the photo sensor 22 at about 20 degrees about an axis that extends in the film advancing direction.

As shown in FIG. 3, the narrow bar elements represent binary "0", whereas the wide bar elements represent binary "1", regardless of whether it is white or black. The first three bits B1 to B3 represent the film roll type and the film length: the 120 type full length film roll, the 120 type half length film roll, or the 220 type film roll. Using three bits of the thirteen bits for the distinction between the three types of Brownie film is redundant.

However, the first three bits or the first three bar elements B1 to B3 are also used for deciding a reference width RW by which the wide bar element and the narrow bar element are distinguished from each other. Specifically, the first three bits B1 to B3 are always constituted of one wide bar element and two narrow bar elements, so the data length DL of the first three bits B1 to B3, or the total width of the first three bar elements B1 to B3, is constant regardless of the film roll type represented by these three bits B1 to B3. The data length DL is measured during the film advancing, and the reference width RW is calculated from the data length DL according to a predetermined equation: $RW=DL \times (35/90)$. The width of each bar element is also measured during the film advancing, and is compared to the reference width RW. If the measured width is more than the reference width RW, the bar element is determined to be a wide bar element. If the measured width is less than the reference width RW, the bar element is determined to be a narrow bar element. As set forth below, the width of each bar element, the data length DL and the reference width RW are not mechanical lengths, but the count of pulses generated synchronously with the film advancing.

Since the adhesive tape 11 of the film roll 7 curls less in its leading half, it is possible to use the data length DL of the first three bits B1 to B3 for determining the reference width RW with no practical problem. As the first three bits B1 to B3 double as a bit pattern for representing the film roll type and the film length, and have no effect on the other bits, the bar code system of the present invention is reasonable and efficient. The following ten bits B4 to B14 are used for representing other classification of the film roll 7, such as color film or white-and-black film, negative or reversal, and film speed. It has been proved that it is difficult to determine the reference width RW accurately based on a data length of first two bits. But using more than three bits for determining the reference width RW restricts the variety of bit patterns, and the reference width RW can be affected by the curl of the adhesive tape 11.

Referring to FIG. 4, when a CPU 24 receives a signal indicating that the rear lid 2 is closed, the CPU 24 drives a motor 26 through a motor driver 25, to rotate the take-up spool 13 through a reduction gear mechanism 27. Along with the motor 26 rotates an encoder plate 28 having a plurality of radial slits formed at regular intervals. A photo interrupter 29 is disposed in association with the encoder plate 28, so the photo interrupter generates one pulse per given rotational angle of the motor 26. Hereinafter, the pulses generated from the photo interrupter 29 will be referred to as motor rotation pulse MP. The motor rotation pulses MP are fed to the CPU 24.

After the start of film advancing, the photo sensor 22 receives light reflected sequentially from the light-shielding paper 9, the adhesive tape 11 and the filmstrip 10, and output electric signal corresponding to the amount of received light. The electric signal is fed to the CPU 24 through a waveform shaping circuit 30. The waveform shaping circuit 30 eliminates noises such as spike pulses from the electric signal.

As shown in FIG. 1, a driven roller 32 is disposed between the exposure aperture 6 and the film take-up chamber 5. The driven roller 32 rotates along with the light-shielding paper 9 and the filmstrip 10 during the film advancing. The driven roller 32 is securely coupled to an encoder plate 33 that has the same construction as the encoder plate 28. A photo interrupter 34 is placed in association with the encoder plate 33, to output one pulse per given rotational angle of the driven roller 32. Since the rotational angle of the driven roller 32 corresponds to the advanced amount of the light-shielding paper 9 and the filmstrip 10, the pulses from the photo interrupter 33 will be referred to as film transport pulses FP. The film transport pulses FP are fed to the CPU 24. In this embodiment the film transport pulse FP is generated each time the Brownie film, i.e., a continuation of the light-shielding paper 9, the filmstrip 10 and thus the adhesive tape 11, is advanced by 1.225 mm, whereas the motor rotation pulse MP is generated each time the Brownie film is advanced by 0.125 mm.

The film transport pulses FP are used for measuring the advanced length of the light-shielding paper 9 and the filmstrip 10 as accurate as possible, whereas the motor rotation pulses MP are used for measuring the advanced length of the light-shielding paper 9 and the filmstrip 10 as frequent as possible.

It is possible to couple the encoder plate 33 to the driven roller 32 through an acceleration gear in order to generate the film transport pulses at a higher frequency. In that case, it is possible to omit generating the motor pulses MP. However, the acceleration gear applies load on the driven roller 32. If the load is too large, the driven roller 32 cannot rotate smoothly, and may have a slip on the light-shielding paper 9 or on the filmstrip 10. By using the two kinds of pulses FP and MP, it is possible to measure the advanced length with sufficient accuracy and frequency without the need for using expensive encoder plates and photo interrupters.

ROM 36, RAM 37 and EEPROM 38 exchange data with the CPU 24. The ROM 36 stores a sequential program for reading the bar code 12, and a data table for decoding the bar code 12. The RAM 37 is used for temporarily storing flags and data obtained during the execution of the sequential program, while the CPU 24 reads the flags and the data from the RAM 37. The EEPROM 38 is to store an initial threshold value S0 that is used for detecting if the adhesive tape 11 moves to the front of the sensor unit 20. The initial threshold value S0 is set up for each individual camera 1, because of variation in sensitivity of the photo sensor 22. The EEPROM 38 is also used for storing reference values that are compared to the number of pulses FP in a bar code reading sequence and in the film advancing sequence, as will be described in detail later.

According to the present embodiment, the width of the start quiet zone 14, which is equal to the spacing from the leading edge of the adhesive tape 11 to the leading edge of the first black bar element B1, is determined to be wider than the wide bar element, and more concretely 4±1 mm. The reason for this definition is as set forth below.

In the bar code reading sequence, the photo sensor 22 samples the sensor signal PLV at a higher frequency enough to detect the narrow bar element, so that it is possible detect the start quiet zone 14 even if the width is 1 mm or so. However, it is difficult to start up the bar code reading sequence immediately after the CPU 24 starts the film advancing sequence upon the rear lid 2 being closed. This is because, in the first stage of this initial film advancing process, the CPU 24 checks conditions of respective switches and other elements of the camera 1, and initialize other sequential programs. As the bar code reading sequence requires a certain amount of processing, the CPU 24 would be overloaded if it executes the bar code reading sequence in parallel with these checking and initializing operation.

For this reason, the CPU 24 first checks if the adhesive tape 11 comes to the sensor unit 20 by sampling the sensor signal from the photo sensor 22 at a rough interval, i.e., each time the Brownie film are advanced by 1 mm to 2 mm. In this embodiment, the sensor signal PLV is sampled at the same interval of the film transport pulses FP, i.e., at every 1.225 mm advance of the Brownie film before the leading edge of the adhesive tape 11 is detected by the photo sensor 22. When it is determined that the leading edge of the adhesive tape 11, i.e. the start quiet zone 14, reaches the sensor unit 20, the CPU 24 starts the bar code reading sequence.

If, in that case, the width of the start quiet zone 14 are not more than 2 mm, the timing of detection of the adhesive tape 11 by the rough interval of checking can be so late that the photo sensor 22 cannot receive a sufficient amount of reflection light from the start quiet zone 14 enough to detect the start quiet zone 14. Therefore, the width of the start quiet zone 14 must be more than 3 mm, when the checking interval is 1 mm to 2 mm.

On the other hand, the width of the start quiet zone 14 is limited by the conditions that the 13-bit bar code 12 whose narrow bar width is about 0.8 mm and wide bar width is about 2.5 times the narrow bar width should be printed on the adhesive tape 11 having a limited width. Therefore, considering tolerable deviations of the bar code 12 relative to the adhesive tape 11, the quiet zone 14 is determined to be not more than 5 mm. The width of the end quiet zone 15 should be not less than 2 mm, but limited by the width of the adhesive tape 11.

The operation of the camera 1 will be described with reference to FIGS. 5 to 8.

Figure 5:
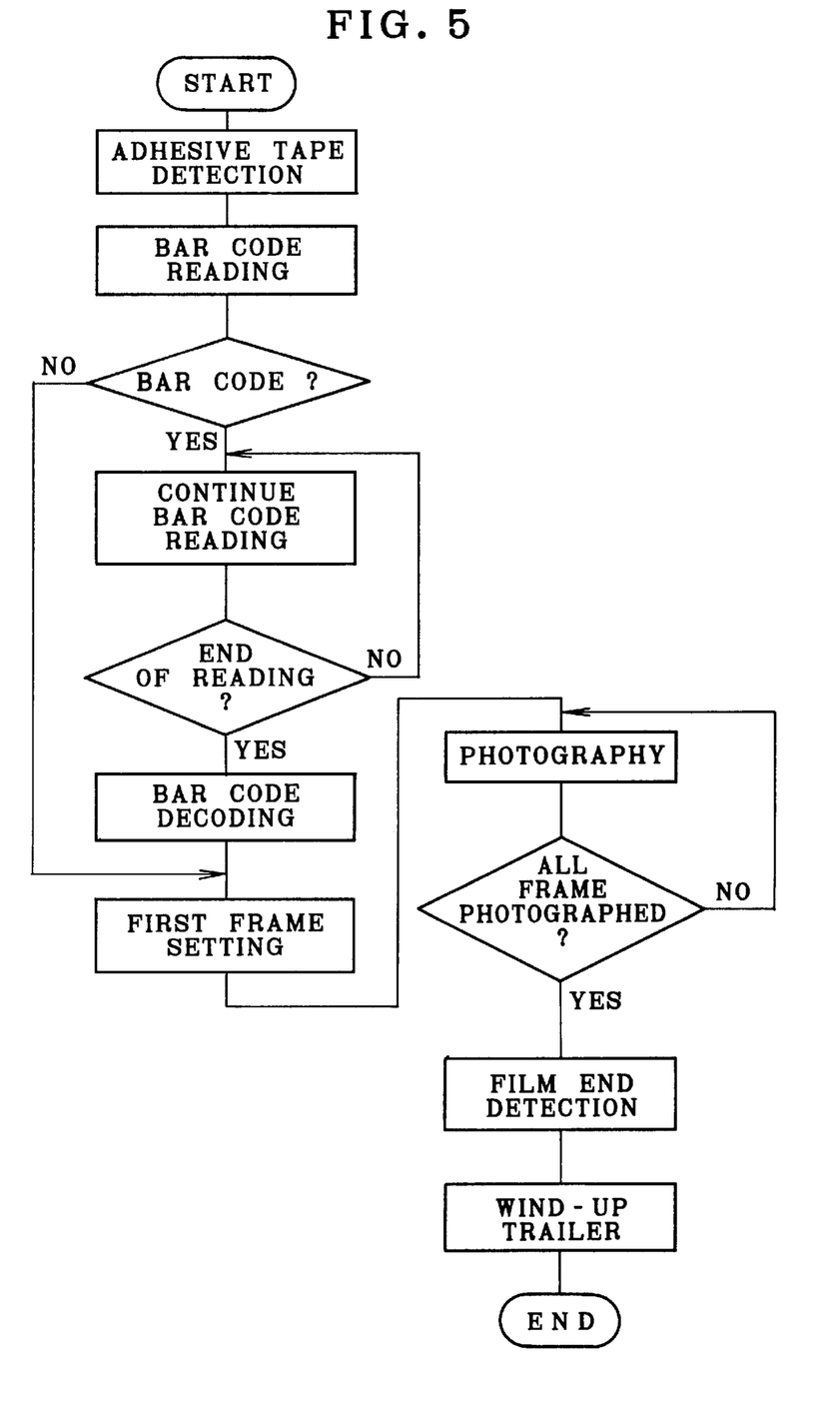
FIG. 5 is a flow chart illustrating the overall operation of the Brownie camera.

FIG. 5 shows a main sequence of the CPU 24, wherein the CPU 24 first detects based on the electric signal from the photo sensor 22 that the adhesive tape 11 moves to the sensor unit 20, and then starts reading and decoding the bar code 12 if the adhesive tape 11 has the bar code 12 thereon. First frame setting is to position the filmstrip 10 to the exposure aperture 6 for the first frame exposure. Since the width of the adhesive tape 11 is defined by the ISO standard, it is possible to position the first frame exposure area behind the exposure aperture 6 by stopping the motor 26 in a given time after the adhesive tape 11 is detected. As will be described later, according to the present invention, the first frame setting may be carried out even if the Brownie film roll 7 is not provided with the bar code 12.

After the first frame setting, the motor 26 is driven to advance the filmstrip 10 by one frame after each exposure. A not-shown frame counter counts the number of exposed frames. When the CPU 24 determines based on the count of the frame counter that all available frames have been photographed, the CPU 24 actuates the sensor unit 20 to detect the trailing end of the filmstrip 10 based on the electric signal from the photo sensor 22. A given time after the trailing end of the filmstrip 10 is detected, the CPU 24 stops driving the motor 26. Since the length of the trailer portion of the light-shielding paper 9 is also within a range given by the ISO standard, the time of stopping the motor 26 may be given according to the length of the trailer portion. When the motor 26 stops in this way, the entire length of the Brownie film, including the trailer portion of the light-shielding paper 9, has been wound up onto the take-up spool 13. Then, it is possible to open the rear lid 2. Since the photo interrupter 34 does not generate the film transport pulse any more after the entire Brownie film is wound up onto the take-up spool 13, it is possible to stop the motor 26 with reference to the film transport pulse.

Figure 6:
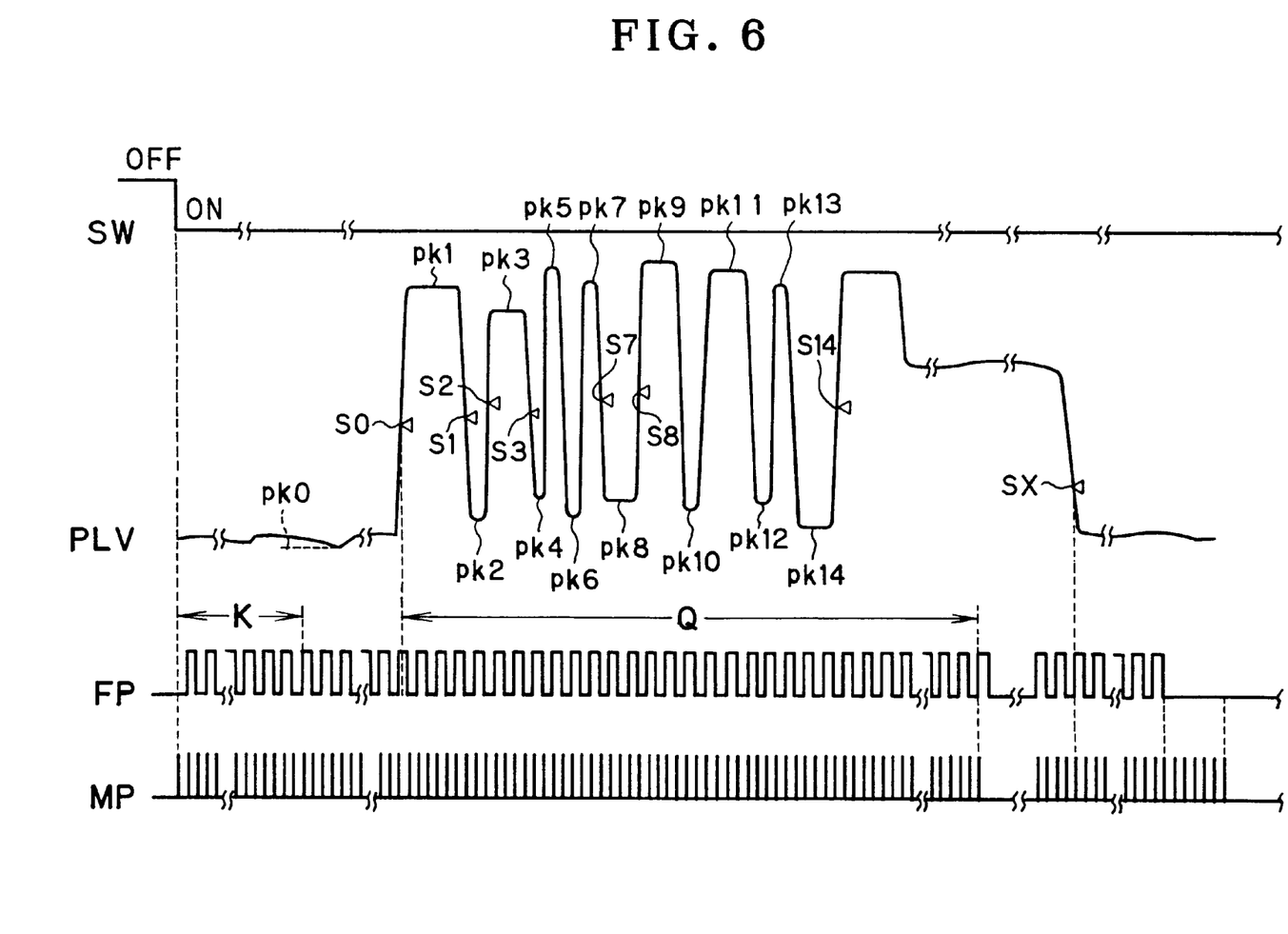
FIG. 6 is a timing chart illustrating the operation of the bar code reader of FIG. 4.
Figure 7A:
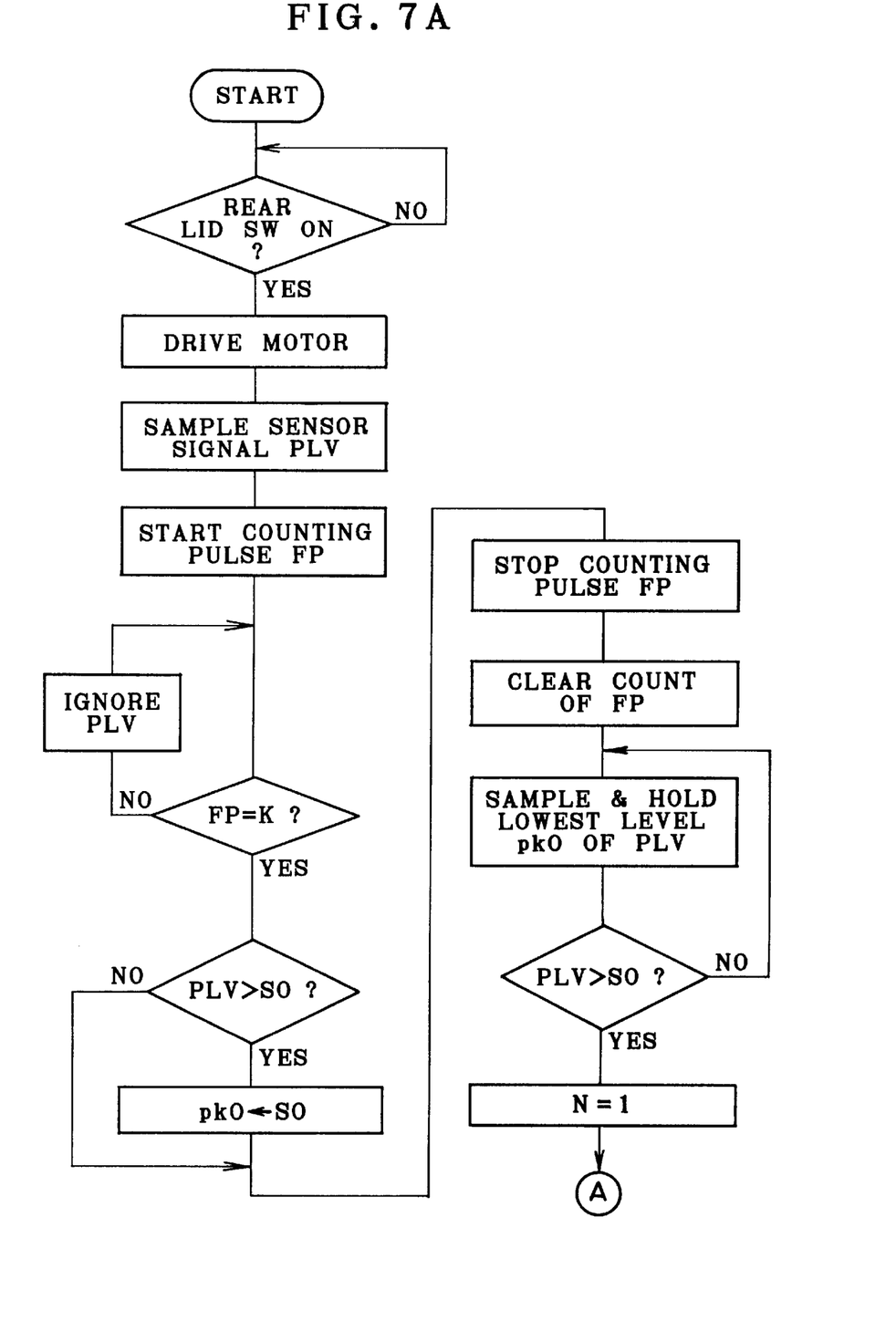
FIG. 7A is a flow chart illustrating a sequence for detecting an adhesive tape of a Brownie film roll.
Figure 7B:
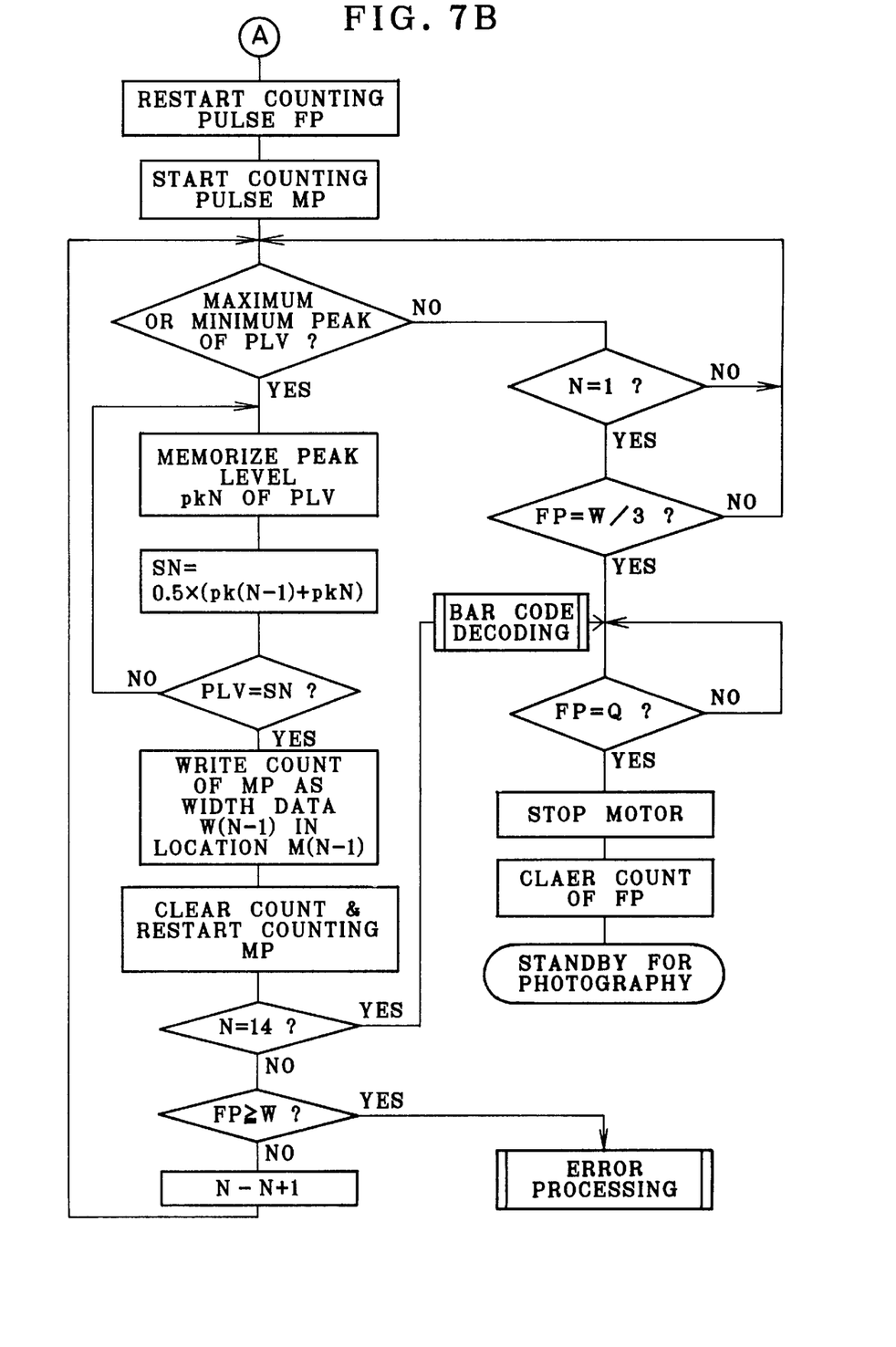
FIG. 7B is a flow chart illustrating a sequence for reading the bar code.
Figure 8:
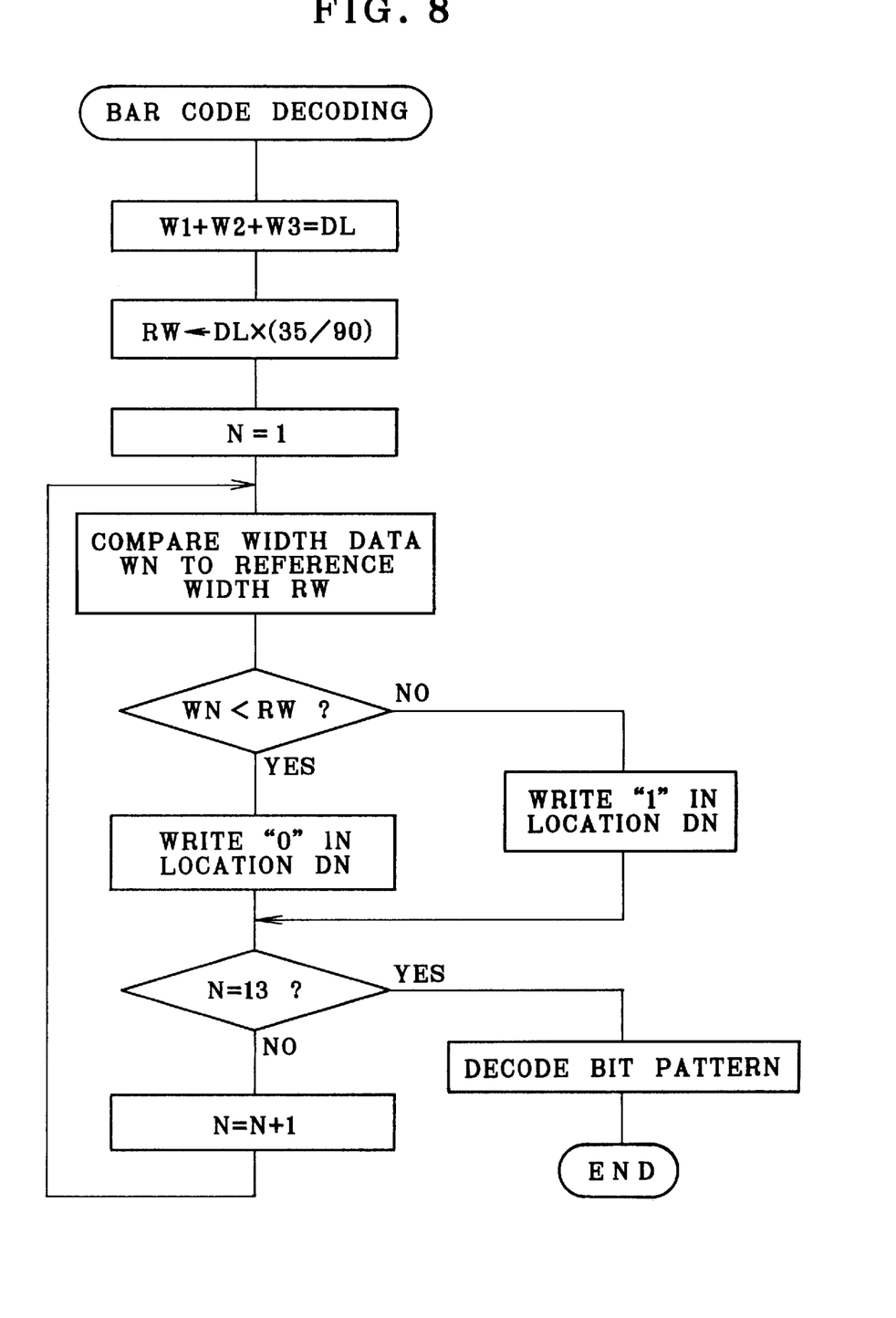
FIG. 8 is a flow chart illustrating a sequence for decoding the bar code.

FIGS. 6 to 8 illustrates the operation of the bar code reader of FIG. 4. When the rear lid 2 is locked in the closed position, a not-shown rear lid switch outputs an ON signal to the CPU 24. Then, the CPU reads the initial threshold value S0 from the EEPROM 38, and uses it for determining whether or not the adhesive tape 11 moves to the sensor unit 20. The initial threshold value S0 is predetermined based on the diffuse reflection density of the obverse surface of the adhesive tape 11, while taking the sensitivity of the photo sensor 22 into consideration. Since the diffuse reflection density of the adhesive tape 11 is higher than the reflection density of the light-shielding paper 9 in every Brownie film roll of any manufacturer, the initial threshold value S0 should be able to detect the adhesive tape 11 having the lowest reflection density from the light-shielding paper 9.

After the threshold value S0 is set up, the CPU 24 starts driving the motor 26 through the motor driver 25. Then, the motor 26 starts rotating the spool 13 through the reduction gear mechanism 27, to wind up the leader portion 9b of the light-shielding paper 9 onto the spool 13. Simultaneously with the start of driving the motor 26, the photo interrupter 29 start generating the motor rotation pulses MP to the CPU 24. As the driven roller 32 starts rotating along with the transport of the light-shielding paper 9, the photo interrupter 34 starts generating the film transport pulses FP to the CPU 24. Also, the CPU 24 starts sampling the level of the sensor signal PLV from the photo sensor 22 at the same interval as the film transport pulses FP. While the light-shielding paper 9 moves in front of the sensor unit 22, the lowest level pk0 of the sensor signal PLV is sampled and held. However, until the number of film transport pulses FP reaches a reference number "K" that is written in the EEPROM 38, the CPU 24 ignores the sampled level of the sensor signal PLV, as shown in FIG. 7A.

For example, the reference number "K" is "20" to "30" on the assumption that the film transport pulse FP is generated at every 1.225 mm advance of the Brownie film. Since the sensor signal PLV is apt to suffer from noises because of unstable transportation immediately after the activation of the motor 26, the sensor signal PLV is ignored for a while following the activation of the motor 26, to eliminate the influence of potential noises on the sensor signal PLV. As set forth later, the lowest level pk0 is used for setting a threshold value S1 for determining the leading edge of the first black bar element B1. In order to set the threshold value S1 properly, it is desirable to eliminate the influence of noises from the lowest value pk0 of the sensor signal PLV by ignoring the sampled levels of the sensor signal PLV in the initial stage of the film advancing.

When the count of the film transport pulses FP reaches the reference number "K", the sensor signal PLV normally takes a lower level than the threshold value S0 as the leader portion 9b of the light-shielding paper 9 is still in front of the sensor unit 20 so long as the camera 10 is operated normally.

If the level of the sensor signal PLV should be higher than the threshold value S0, it means that an abnormal operation, such as an accidental opening of the rear lid 2, has been made. In that case, the sampled level of the sensor signal PLV is not used for setting the threshold value S1, but the initial threshold value S0 is substituted for the lowest level pk0. The reason for this process will be described later.

When the count of the film transport pulses FP reaches the reference number "K", the CPU 24 stops counting the film transport pulses FP and clears the count. If the level of the sensor signal PLV is lower than the threshold value S0, the CPU 24 continues sampling the sensor signal PLV. As the leader portion 9b passes by the sensor unit 20, the sensor signal PLV varies a little within a low level range, and the CPU 24 samples and holds the lowest level pk0 of the sensor signal PLV, as shown in FIG. 6.

When the adhesive tape 11 comes to the sensor unit 20, the level of the sensor signal PLV surges up because of the start quiet zone 14 of the adhesive tape 11. When the sensor signal PLV goes above the threshold level S0, the CPU 24 determines that the adhesive tape 11 comes to the sensor unit 20. Then the CPU 24 restarts counting the film transport pulses FP and starts counting the motor rotation pulses MP. Before the quiet zone 14 is detected, the sensor signal PLV is sampled at the interval of the film transport pulses FP, i.e., at every 1.225 mm advance of the Brownie film. While the 4±1 mm wide start quiet zone 14 passes by the sensor unit 20, the CPU 24 starts the bar code reading sequence, wherein the sensor signal PLV is sampled at the same interval of the motor rotation pulse MP, that is, each time the Brownie film is advanced by 0.125 mm. Therefore, it is possible to scan the narrow bar elements whose width is about 0.8 mm, at a practically sufficient resolving power.

Simultaneously with the detection of the leading edge of the adhesive tape 11 by the sensor unit 20, the CPU 24 also sets a number N to "1", wherein the number N is used for numbering peaks of the sensor signal PLV and for numbering borders between the black bar elements and the white bar elements during the bar code reading sequence.

When the first black bar element B1 comes to the sensor unit 20, the level of the sensor signal PLV goes down. When the sensor signal PLV drops by a given amount, the CPU 24 detects the highest level of the sensor signal PLV sampled immediately before the drop of the sensor signal PLV, and holds it as a first peak value pk1 in a predetermined location of the RAM 37. On the contrary, where there is not any bar code 12 on the adhesive tape 11, the sensor signal PLV is maintained substantially unchanged. Thereafter, the CPU 24 decides that the adhesive tape 11 has no bar code 12, when the CPU 24 does not detect any drop and thus any peak of the sensor signal PLV before the count of the film transport pulses FP reaches a value W/3, wherein W represents the number of pulses FP corresponding to the width of the adhesive tape 11. In that case, the CPU 24 proceeds to the first frame setting sequence, as shown in FIG. 7B. Accordingly, the camera can operate with no problem even when a Brownie film roll having no bar code is loaded while preventing bar code reading errors with reliability.

After the first peak value pk1 is stored, the threshold value S1 for determining the leading edge of the first black bar element B1 is calculated as an arithmetic mean value of the lowest level pk0 and the peak value pk1. Thereafter when the sensor signal PLV goes down to the threshold value S1, the CPU 24 writes the count of the motor rotation pulses MP in a location M0 of the RAM 37 and, at the same time, clears the count of the motor rotation pulses MP and restarts counting the motor rotation pulses MP.

Thereafter, the CPU 24 checks if the number N reaches "14". Since the number N is "1", the CPU 24 checks if the count of the film transport pulses FP is less than the number W that corresponds to the width of the adhesive tape 11. In the normal operation, the count of the film transport pulses FP continues to be less than the number W before the bar code reading sequence is accomplished. Therefore, the number N is normally incremented to "2" in this stage.

Thereafter when the sensor signal PLV jumps up by a given amount, the CPU 24 determines that the first black bar element B1 goes past the sensor unit 20 and thus the succeeding white bar element B2 comes to the sensor unit 20. Then, the CPU 24 detects a latest lowest level of the sensor signal PLV and holds it as a second peak value pk2 in the memory 37. Thereafter, a threshold value S2 for determining the trailing edge of the first bar element B1 is calculated as an arithmetic mean value of the peak values pk1 and pk2. The number of motor rotation pulses MP, which is counted from the time when the sensor signal PLV drops from the peak value pk1 down to the value S1 to the time when the sensor signal PLV thereafter goes up to the value S2, is written as width data W1 representative of the width of the first black bar element B1 in a location M1 of the RAM 37.

In the same way, an arithmetic mean value of the peak value (a minimum value) pk2 and a next peak value (a maximum value) pk3 of the sensor signal PLV is determined to be a threshold value S3 for discriminating between the first white bar element B2 and the second black bar element B3. The width of the first bar element B2 is detected as a count of the motor rotation pulses MP counted from the threshold value S2 to the threshold value S3. Thus, threshold values SN for discriminating between the bar elements BN and B(N−1) are calculated as arithmetic mean values of preceding two peak values pkN and pk(N−1), while incrementing the number N one by one. And width data WN of the individual bar element BN is detected as a count of the motor rotation pulses MP between the threshold values SN and S(N+1), and is written in a location MN of the RAM 37. In this way, when the number N reaches "14", width data W1 to W13 of the individual bar elements B1 to B13 are written in the locations M1 to M13 of the RAM 37 respectively. It is to be noted that the count of the motor rotation pulses MP written in the location M0 is representative of the width of the start quiet zone 14, though it is not used for decoding the bar code 12.

As described above, the adhesive tape 11, as well as the light-shielding paper 9 and the filmstrip 10, curls more or less as they are rolled around the spool 8. Therefore, as shown in FIG. 6, the maximum levels of the sensor signal PLV vary mainly because of variation in distance from the obverse surface of the curled 11 to the photo sensor 22. The same applies to the minimum levels of the sensor signal PLV. Revising the threshold values SN according to the preceding peak values of the sensor signal PLV reduces influence of the peak level variations on the edge discrimination, and hence allows to detect the widths of the bar code elements B1 to B13 with high accuracy.

Instead of the arithmetic mean value of the preceding two maximum and minimum values of the sensor signal PLV, it is possible to calculate the threshold value SN using an average of preceding two or more maximum values and an average of preceding two or more minimum values. This method is effective to prevent the threshold value SN from changing excessively when the sensor signal PLV takes an irregularly high or low level due to a stain on the adhesive tape 11.

When the CPU 24 determines that the number N reaches "14", the CPU 24 starts a sequence for decoding bar code. If the CPU 24 detects that the count of the film transport pulses FP reaches the number W before the number N reaches "14", the CPU 24 effects an error processing. In the error processing, for example, an error warning is given by use of a not-shown display device of the camera, to instruct the photographer to manually enter necessary film data.

It is to be noted that the bar code reading sequence is terminated when the number N reaches "14" because the bar code 12 is a 13-bit code in this embodiment. That is, if the bar code 12 consists of more than thirteen bits, the bar code reading sequence is terminated when the number N is incremented up to a correspondingly larger number.

As described above, if the sensor signal PLV goes above the threshold value S0, it means that the adhesive tape 11 or the filmstrip 10 comes to the sensor unit 20. Since the CPU 24 starts the main sequence of FIG. 5 in response to the ON signal from the rear lid switch, if the rear lid 2 should be accidentally opened for a moment during the execution of the main sequence, the CPU 24 restarts counting the film transport pulses FP from zero and comparing the count to the number "K". In that case, the sensor signal PLV is more than the threshold value S0 when the count of the film transport pulses FP reaches the number "K". By not using the sampled lowest level pk0, but using the threshold value S0 instead for calculating the threshold value S1 to detect the leading edge of the first black bar code B1, the consequent threshold value S1 is downshifted. Thus, even through the sensor signal PLV fluctuates because of noises or the like while the photo sensor 22 detects the filmstrip 10 or the quiet zone 14 or 15, the fluctuation would not be mistaken for the bar code 12.

FIG. 8 shows an embodiment of the bar code decoding sequence. First, the CPU 24 reads out the width data W1 to W3 from the locations M1 to M3, and adds up to obtain the data length DL of the first three bits B1 to B3. Next, the reference width RW is calculated from the data length DL according to the equation: $RW=DL\times(35/90)$. Thereafter, each of the width data W1 to W13 of the locations M1 to M13 is sequentially compared to the reference width RW. Depending upon whether the width data WN is less than or more than the reference width RW, a binary value "0" or "1" is written as code data in a location DN of the RAM 37, wherein N=1, 2, 3 ... 13. When the binary values have been written in the code data locations D1 to D13, the CPU 24 refers to the table stored in the ROM 36, and determines the film roll type and the film length by the bit pattern of the first three bits B1 to B3, and the film speed and other classifications of the film roll 7 by the bit pattern of the fourth to thirteenth bits B4 to B13.

The film roll type and the film length determined by the bar code 12 are used for setting the available number of exposures in a film counter of the camera 1, and for checking if the manually set position of the pressure plate 18 is proper. It is possible to provide the camera 1 with a device for switching the position of the pressure plate 18 automatically according to the film roll type determined by the bar code 12. The film speed is used as a factor for controlling exposure.

From the time when the leading edge of the adhesive tape 11 is detected with reference to the threshold value S0, the CPU 24 restarts counting the film transport pulses FP, and compares the count of the film transport pulses FP to a reference number "Q" that is written in the EEPROM 38. When the count of the film transport pulses FP reaches the number "Q", the CPU 24 stops the motor 26, the first frame exposure area is positioned behind the exposure aperture 6. As the width of the adhesive tape 11 is within the range defined by the ISO standard, the number "Q" may be predetermined according to the width of the adhesive tape 11. At that time, the photo sensor 22 detects reflection light from the filmstrip 10, so the level of the sensor signal PLV corresponds to the reflection density of the filmstrip 10.

After the first frame exposure area is placed behind the exposure aperture 6, the CPU 24 clears the count of the film transport pulses FP, and stands by the photographic operation. After making an exposure, the CPU 24 drives the motor 26 to advance the Brownie film by one frame. As the driven roller 32 rotates simultaneously, the photo interrupter 34 restarts generating the film transport pulses FP, so the CPU 24 restarts counting the film transport pulses FP, to stop the motor 26 when the count of the film transport pulses FP reaches a given number corresponding to the length of one frame.

When all the available frames have been photographed on the filmstrip 10, the motor 26 is driven continuously until the light-shielding paper 9 is entirely wound up onto the take-up spool 13. Because a certain length of the filmstrip 10 remains unexposed behind the last exposed frame, the photo sensor 22 continues to detect reflection light from the filmstrip 10 for a while after the exposure of all available frames. When the trailing end of the filmstrip 10 goes past the sensor unit 20, the photo sensor 22 begins to detect reflection light from the trailer portion of the light-shielding paper 9, and thus the sensor signal PLV takes a low level corresponding to the reflection density of the light-shielding paper 9, as shown in FIG. 6.

Accordingly, the sensor signal PLV is compared to a final threshold value SX that is lower than a level range corresponding to the reflection density of the filmstrip 10 but is higher than a level range corresponding to the reflection density of the light-shielding paper 9. Thereby, the CPU 24 detects when the trailing end of the filmstrip 10 goes past the sensor unit 20. The final threshold value SX is also written in the EEPROM 38. After the detection of the trailing end of the filmstrip 10, the CPU 24 stops the motor 26 in a predetermined time corresponding to a known normal length of the trailer portion of the light-shielding paper 9. In this way, the motor 26 automatically stops after the entire length of the Brownie film is wound up onto the take-up spool 13. It is possible to stop the motor 26 when the photo interrupter 34 stops generating the film transport pulses FP after the trailing end of the filmstrip 10 is detected by the photo sensor 22.

If the photo sensor 22 is used only for reading the bar code 12 on the adhesive tape 11, the sensor unit 20 may be placed between the exposure aperture 6 and the film take-up chamber 5.

Thus, the present invention is not to be limited by the embodiments shown in the drawings but, on the contrary, various modification will be possible for person skilled in the art without departing from the scope of claims attached hereto.

What is claimed is:

1. A bar code system for a Brownie film roll consisting of a bar code reader of a camera and a bar code provided on an adhesive tape of the Brownie film roll that secures a filmstrip to a light-shielding paper at a leading end of the filmstrip, wherein the bar code comprises alternating black and white bar elements each having a wide width or a narrow width, first three of the bar elements in the order to scan the bar code have a constant total width independent of data represented by the bar code, and wherein the bar code reader comprises:

a reflective photo sensor for scanning the bar code while the light-shielding paper and the filmstrip are advanced in the camera;

a device for detecting borders between the black bar elements and the white bar elements based on signal level of the photo sensor;

a device for measuring widths of the individual bar elements based on the detected borders;

a memory for storing data of the measured widths;

a device for calculating a reference width from a total of the measured widths of the first three bar elements;

a device for discriminating between those bar elements having the wide width and those having the narrow width by comparing the measured widths to the reference width; and a device for decoding the bar code based on a bit pattern of the bar code corresponding to an arrangement of the narrow width and the wide width of the bar elements.

2. A bar code system according to claim 1, wherein the first three bar elements represent data of film roll type and film length.

3. A bar code reader for a camera for use with a Brownie film roll, the Brownie film roll comprising a filmstrip, a light-shielding paper secured to the filmstrip at least at a leading end of the filmstrip by an adhesive tape, and a bar code provided on the adhesive tape by printing black bar elements on an obverse surface of the adhesive tape with given spacings in a direction to advance the filmstrip in the camera, the spacings between the black bar elements forming white bar elements, the bar code reader comprising:

a reflective photo sensor for scanning the bar code while the light-shielding paper and the filmstrip are advanced from the film supply chamber to the film take-up chamber;

a device for sampling signal level of the photo sensor and holding at least one maximum value and one minimum value of the signal level of the photo sensor;

a device for detecting the leading edge of the adhesive tape by comparing the signal level of the photo sensor to a predetermined threshold value; and a device for detecting borders between the bar elements by comparing the signal level of the photo sensor to a threshold value while revising the threshold value after each detection of the borders in accordance with the held maximum and minimum values;

wherein the threshold value for detecting the next border is an arithmetic mean value of the latest maximum value and the latest minimum value which are held before.

4. A bar code reader for a camera for use with a Brownie film roll, the Brownie film roll comprising a filmstrip, a light-shielding paper secured to the filmstrip at least at a leading end of the filmstrip by an adhesive tape, and a bar code provided on the adhesive tape by printing black bar elements on an obverse surface of the adhesive tape with given spacings in a direction to advance the filmstrip in the camera, the spacings between the black bar elements forming white bar elements, and the spacing from a leading edge of the adhesive tape to a first black bar element forming a start quiet zone, the bar code reader comprising:

a reflective photo sensor for scanning the bar code while the light-shielding paper and the filmstrip are advanced by rotating a take-up spool to which a leading end of the light-shielding paper is secured;

a device for measuring the advanced length of the light-shielding paper and hence the filmstrip;

a device for sampling signal levels of the photo sensor, and holding maximum and minimum values of the signal level; and a device for detecting the leading edge of the adhesive tape by comparing the signal level of the photo sensor to a predetermined threshold value, and for detecting a leading edge of the first black bar element by comparing the signal level of the photo sensor to a threshold value that is determined based on a minimum value held before the photo sensor detects the leading edge of the adhesive tape and a maximum value held while the photo sensor detects the start quiet zone, wherein the sampling device starts holding the maximum and minimum values only when the advanced length measured from the start of rotating the take-up spool reaches a given length, the given length being less than a preceding length of the light-shielding paper to the adhesive tape in the direction to advance the filmstrip.

5. A bar code reader according to claim 4, wherein the device for measuring the advanced length comprises a driven roller rotated by movement of the light-shielding paper and the filmstrip, a pulse generator for generating one pulse per given rotational angle of the roller, and a counter for counting the pulses, and wherein the count is compared to a number corresponding to the given length.

6. A bar code reader according to claim 5, further comprising a second pulse generator for generating second kind pulses at a higher frequency than the first kind pulses, the second pulse generator cooperating with a motor for rotating the take-up spool to generate the second kind pulses synchronously with rotation of the motor, wherein the sampling device samples the signal level of the photo sensor at the frequency of the first kind pulses before the leading edge of the adhesive tape is detected, and thereafter at the higher frequency of the second kind pulses.

7. A bar code reader according to claim 6, further comprising:
 a device for detecting borders between the bar elements by comparing the sampled signal level of the photo sensor to a threshold value while revising the threshold value according to the held maximum and minimum values;
 a second counter for counting the second kind pulses to measure the width of the individual bar element as a count of the second kind pulses;
 a memory for storing data of the measured widths;
 a device for discriminating between those bar elements having the wide width and those having the narrow width by comparing the measured widths to a reference width; and
 a device for decoding the bar code based on a bit pattern of the bar code corresponding to an arrangement of the narrow width and the wide width of the bar elements.

8. A Brownie film comprising a filmstrip, a light-shielding paper secured to the filmstrip at least at a leading end of the filmstrip by an adhesive tape, and a bar code provided on the adhesive tape, the bar code consisting of alternating black and white bar elements each having a wide width or a narrow width, wherein first three of the bar elements, in the order to scan the filmstrip in a camera, being representative of data of film roll type and film length and having a constant total width independent of the data.

9. A method of reading a bar code provided on an adhesive tape of the Brownie film roll that secures a filmstrip to a light-shielding paper at a leading end of the filmstrip, wherein the bar code comprising alternating black and white bar elements each having a wide width or a narrow width, first three of the bar elements in the order to scan the bar code have a constant total width independently of data represented by the bar code, the method comprising the steps of:
 scanning the bar code while the light-shielding paper and the filmstrip are advanced in the camera;
 detecting borders between the black bar elements and the white bar elements based on signal level of the photo sensor;
 measuring widths of the individual bar elements based on the detected borders;
 storing data of the measured widths;
 calculating a reference width from a total of the measured widths of the first three bar elements, based on the first three bar elements having a known, constant total width;
 discriminating between those bar elements having the wide width and those having the narrow width by comparing the measured widths to the reference width; and
 decoding the bar code based on a bit pattern of the bar code corresponding to an arrangement of the narrow width and the wide width of the bar elements.

10. A method of reading a bar code provided on a roll of Brownie film, the Brownie film comprising a filmstrip, a light-shielding paper secured to the filmstrip at least at a leading end of the filmstrip by an adhesive tape and a bar code provided on the adhesive tape by printing the black bar elements on an obverse surface of the adhesive tape with given spacings in a direction to advance the filmstrip in a camera, and the obverse surface of the adhesive tape having a higher reflectance than the light-shielding paper and the black bar elements, thereby the spacings between the black bar elements forming the white bar elements, and the spacing from a leading edge of the adhesive tape to a first black bar element forming a start quiet zone, the method of reading the bar code comprising the steps of:
 A. scanning the bar code while the light-shielding paper and the filmstrip are advanced by rotating a take-up spool by a motor after a leading end of the light-shielding paper is secured to the take-up spool;
 B. measuring the advanced length of the light-shielding paper and hence the filmstrip;
 C. sampling signal level of the photo sensor;
 D. from a time when the advanced length measured from the start of rotating the take-up spool reaches a given length, holding maximum and minimum values of the signal level, wherein the given length is less than a preceding length of the light-shielding paper to the adhesive tape in the direction to advance the filmstrip;
 E. detecting the leading edge of the adhesive tape by comparing the signal level of the photo sensor to a predetermined threshold value;
 F. calculating a threshold value based on a minimum level held before the leading edge of the adhesive tape is detected and a maximum value sampled from the start quiet zone; and
 G. detecting a leading edge of the first black bar element by comparing the signal level of the photo sensor to the calculated threshold value.

11. A method according to claim 10, further comprising the steps of detecting borders between the bar elements by comparing the signal level of the photo sensor to a threshold value while revising the threshold value after each detection of the borders in accordance the held maximum and minimum values of the signal level.

12. A method according to claim 10, wherein if the signal level is not less than the predetermined threshold value when the advanced length measured from the start of rotating the take-up spool reaches the given length, the predetermined threshold value is used for calculating the threshold value for detecting the leading edge of the first black bar element, instead of the minimum value held before the detection of the leading edge of the adhesive tape.

13. A method of reading a bar code provided on a roll of Brownie film, the Brownie film comprising a filmstrip, a light-shielding paper secured to the filmstrip at least at a leading end of the filmstrip by an adhesive tape and a bar code provided on the adhesive tape by printing the black bar elements on an obverse surface of the adhesive tape with given spacings in a direction to advance the filmstrip in a camera, and the obverse surface of the adhesive tape having a higher reflectance than the light-shielding paper and the black bar elements, thereby the spacings between the black bar elements forming the white bar elements, and the spacing from a leading edge of the adhesive tape to a first black bar element forming a start quiet zone, the method of reading the bar code comprising the steps of:

A. scanning the bar code while the light-shielding paper and the filmstrip are advanced by rotating a take-up spool by a motor after a leading end of the light-shielding paper is secured to the take-up spool;

B. measuring the advanced length of the light-shielding paper and hence the filmstrip;

C. sampling signal level of the photo sensor;

D. holding maximum and minimum values of the signal level;

E. detecting the leading edge of the adhesive tape by comparing the signal level of the photo sensor to a predetermined threshold value;

F. calculating a threshold value based on a minimum level held before the leading edge of the adhesive tape is detected and a maximum value sampled from the start quiet zone; and G. detecting a leading edge of the first black bar element by comparing the signal level of the photo sensor to the calculated threshold value;

wherein if the signal level of the photo sensor does not change more than a given amount before the advanced length measured from the time the leading edge of the adhesive tape is detected reaches a predetermined length, the signal level of the photo sensor is not used for decoding the bar code.

14. A method according to claim 11, wherein the signal level of the photo sensor is sampled at a low frequency before the leading edge of the adhesive tape is detected, and thereafter at a higher frequency.

15. A method according to claim 11, wherein the start quiet zone has a length of 3 mm to 5 mm in the direction to advance the filmstrip, and the signal level is sampled each time the advanced length reaches 1 mm to 2 mm before the leading edge of the adhesive tape is detected.

16. A bar code reader for a camera for use with a Brownie film roll, the Brownie film roll comprising a filmstrip, a light-shielding paper secured to the filmstrip at least at a leading end of the filmstrip by an adhesive tape, and a bar code provided on the adhesive tape by printing black bar elements on an obverse surface of the adhesive tape with given spacings in a direction to advance the filmstrip in the camera, the spacings between the black bar elements forming white bar elements, and the spacing from a leading edge of the adhesive tape to a first black bar element forming a start quiet zone, the bar code reader comprising:

a reflective photo sensor for scanning the bar code while the light-shielding paper and the filmstrip are advance by rotating a take-up spool to which a leading end of the light-shielding paper is secured;

a device for measuring an advanced length of the light-shielding paper, comprising a driven roller, a first pulse generator structured and arranged to generate first pulses based on rotation of the driven roller, and a pulse counter;

a device for sampling signal levels of the photo sensor, and holding maximum and minimum values of the signal level;

a second pulse generator structured and arranged to generate second pulses at a higher frequency than a frequency of the first pulses, the second pulse generator with a motor for rotating the take-up spool to generate the second pulses synchronously with rotation of the motor, wherein the sampling device is adapted to sample the signal level of the photo sensor at the frequency of the first pulses before the leading edge of the adhesive tape is detected, and thereafter at the higher frequency of the second pulses; and a device for detecting the leading edge of the adhesive tape by comparing the signal level of the photo sensor to a predetermined threshold value, and for detecting a leading edge of the first black bar element by comparing the signal level of the photo sensor to a threshold value that is determined based on a minimum value held before the photo sensor detects the leading edge of the adhesive tape and a maximum value held while the photo sensor detects the start quiet zone, wherein the sampling device starts holding the maximum and minimum values when the advanced length measured from the start of rotating the take-up spool reaches a given length, the given length being less than a preceding length of the light-shielding paper to the adhesive tape in the direction to advance the filmstrip.

17. The Brownie film of claim 8, wherein the first three bar elements consist of two narrow bar elements and one wide bar element.

* * * * *